(12) United States Patent
Weijkamp et al.

(10) Patent No.: US 10,471,730 B2
(45) Date of Patent: Nov. 12, 2019

(54) METHOD OF RELIEF PRINTING AND A RELIEF PRINTER

(71) Applicant: Océ Holding B.V., Venlo (NL)

(72) Inventors: Clemens T. Weijkamp, Venlo (NL); Antonius M. Gerrits, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/987,248

(22) Filed: May 23, 2018

(65) Prior Publication Data

US 2018/0345681 A1    Dec. 6, 2018

(30) Foreign Application Priority Data

May 31, 2017  (EP) ..................... 17173740

(51) Int. Cl.
| | |
|---|---|
| *H04N 1/46* | (2006.01) |
| *B41J 2/21* | (2006.01) |
| *B41J 2/045* | (2006.01) |
| *B41J 11/00* | (2006.01) |
| *B41M 5/00* | (2006.01) |

(52) U.S. Cl.
CPC ......... *B41J 2/2103* (2013.01); *B41J 2/04586* (2013.01); *B41J 11/0015* (2013.01); *B41M 5/0047* (2013.01); *B41M 2205/40* (2013.01)

(58) Field of Classification Search
CPC ............. B05D 5/06; H04N 1/54; H04N 1/393
USPC ........................................................ 358/2.1
See application file for complete search history.

(56) References Cited

U.S. PATENT DOCUMENTS

| 8,976,415 B2* | 3/2015 | Klein Koerkamp ..... B05D 5/06 358/2.1 |
|---|---|---|
| 2015/0144014 A1 | 5/2015 | Klein Koerkamp et al. |
| 2016/0193823 A1 | 7/2016 | Klein Koerkamp |
| 2016/0318258 A1 | 11/2016 | Valade |

FOREIGN PATENT DOCUMENTS

EP    2 672 692 A2    12/2013

OTHER PUBLICATIONS

European Search Report for EP 17 17 3740 completed on Nov. 2, 2017.

* cited by examiner

*Primary Examiner* — Lam S Nguyen
(74) *Attorney, Agent, or Firm* — Birch, Stewart, Kolasch & Birch, LLP

(57) ABSTRACT

A printing method for printing a digital image on a substantially flat substrate includes providing the digital image including a raster of a plurality of pixels; providing a height channel to the digital image defining a height for each pixel; discriminating in the digital image for each pixel a relief part, a white part and a skin part; providing an inking mask including a binary image of areas of the substrate to be finished and areas of the substrate not to be finished; image processing of the digital image by applying the inking mask to the image, wherein the height of a pixel within an area of the substrate to be finished is reduced by substantially reducing a height of the relief part of said pixel; and printing the processed image obtained in the image processing step on the substrate.

14 Claims, 9 Drawing Sheets

| Thickness (μm) | Ink type a | Ink type b |
|---|---|---|
| 10 | no | no |
| 20 | no | no |
| 30 | yes | no |
| 40 | yes | no |
| 50 | yes | no |
| 75 | yes | yes |
| 125 | yes | yes |
| 250 | yes | yes |
| 500 | yes | na |
Fig. 6C
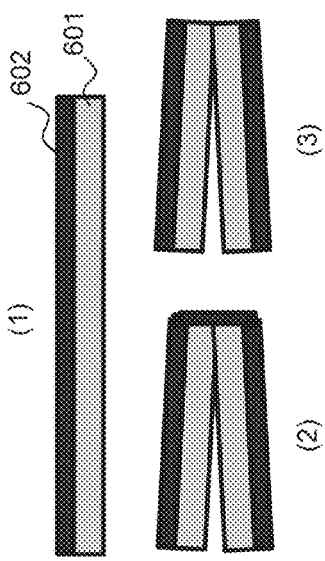
Fig. 6A
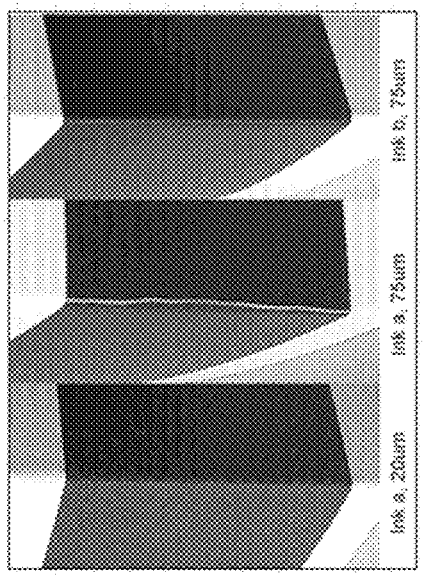
Fig. 6B

METHOD OF RELIEF PRINTING AND A RELIEF PRINTER

FIELD OF THE INVENTION

The present invention relates to a method of printing for producing objects by additive manufacturing.

BACKGROUND ART

Additive manufacturing techniques using ink-jet technology are known in the art, for example from US patent publication US2015/144014, wherein a method for generating relief prints is disclosed. Ink-jet technology creates a solid ink layer on top of a substrate. When multiple layers are printed textured structures can be created. A solid ink layer tends to crack, break or chip during finishing after printing like folding, bending, creasing or cutting. Finishing by finishing lines, for example cut paths, folding patterns, etc., may be specified in print job specifications of a print job for printing a relief print. The solid ink layer comprises three parts: a relief part, a white part and a colored skin part. The relief part is deposited on the substrate and covered with a white part to be able to print in full color. The white part is covered with the colored skin part.

Finishing a print job is not meant as completing a print job but as executing finishing actions—post processing steps—by finishing equipment as specified in print job specifications.

For the term "substrate" also the term "media" will be used hereinafter.

Modern UV ink formulations create a more flexible solid ink layer to prevent cracking. However, when multiple ink layers are printed to create a textured print a total ink package becomes more stiff and brittle, and thus cracking will occur. Besides this, flexible ink formulations are less suitable for textured multiplayer printing.

The known methods relate to single object manufacturing. If one desires to fold the printed object, to crease the printed object, to bend the printed object or to cut the printed object, there is a significant risk of damaging the printed object.

Another problem qua colors of cutting edges arises when cutting a textured print. The height sides along the cut line may show the relief and the white part according to the colors of the relief and white parts for the pixels at the location of the cut line which may differ from the colors of the color part for the pixels at the location of the cut line.

It is therefore an object of the present invention to overcome or at least mitigate said disadvantages and provide a method of printing for directly manufacturing the intended object which can be finished after printing, i.e. folded, creased, bended or cut with elimination of the risk of damaging the printed object due to the folding, creasing, bending or cutting and with elimination of the above-mentioned cutting edge color problem.

SUMMARY OF THE INVENTION

This object can be obtained with a printing method for printing a digital image on a substantially flat substrate, the printing method comprising the steps of a) providing the digital image comprising a raster of a plurality of pixels, the digital image comprising color information for each pixel, b) providing a height channel to the digital image defining a height for each pixel, the height having a minimum value, c) discriminating in the digital image for each pixel a relief part, a white part and a skin part, the parts constituting the height of the pixel and the relief part comprising an arbitrary colorant composition, the white part comprising a number of colorants including a white colorant and the skin part comprising colorants according to a color as defined by the color information for each pixel, d) providing an inking mask comprising a binary image of areas of the substrate intended to be finished after printing and areas of the substrate not intended to be finished after printing;

e) image processing of the digital image by applying the inking mask to the image, wherein the height of a pixel within an area of the substrate intended to be finished after printing is reduced by substantially reducing a height of the relief part of said pixel, and wherein the height of a pixel within an area of a substrate not intended to be finished after printing is left unchanged, and f) printing the processed image obtained in step e) on the substrate.

According to an embodiment the height value of each pixel in the area of the substrate intended to be finished after printing is so large that at least the skin part is intended to be printed. By doing so, the colored image is still visible in the substrate area intended to be finished after printing.

According to an embodiment the height value of each pixel in the area of the substrate to be finished after printing is so small that no relief part is intended to be printed. By printing no relief part, the height is reduced to the at least the skin part and the white part in order to minimize a chance on cracking of the ink layers in the substrate areaintended to be finished after printing.

The finishing action in the area intended to be finished is at least one out of a fold, a crease, a bending and a cut of the substrate. The areas of the substrate intended to be finished are including and surrounding finishing lines like fold lines, crease lines, bend lines and/or cut lines. The finishing lines may be curved. In the areas intended to be finished the digital image is printed according to the color information per pixel provided in step a), but not according to the height information per pixel provided in step b). In the areas intended to be finished the digital image has been image processed according to step e) before the printing step f).

According to a further embodiment the method comprising the step of finishing by means of finishing equipment the processed image in step f) in the areas intended to be finished. The finishing equipment may be at least one out of a folder, a creaser, a bender, a puncher, a stapler and a cutter.

In the areas not intended to be finished the digital image is printed according to the provided color information per pixel as well as according to the provided height information per pixel.

By doing so, the method according to the present invention has full control with respect to the applied inking mask, e.g. a number, a size and a width of the fold, crease, bending or cut lines can be completely controlled dependent on the desired application, by defining the inking mask.

According to a further embodiment the area intended to be finished comprises an edge of the substrate. Near an edge of a substrate the relief may be reduced to zero according to the invention. This is advantageous, since by doing so the edges are less vulnerable for damage.

It is advantageous of the method according to the invention that the color information at the area intended to be finished is not lost, such that a complete color image intended to cover the whole area intended to be finished is printed.

In the method according to the present invention a printing technique that is suitable for additive manufacturing and/or capable of forming an image (picture) can be used. An example of such a printing technique is ink jetting a radiation curable, e.g. UV-curable, ink composition. In such printing technique (known in the art) a layer of liquid ink is applied to the surface of a substrate (which may also be a previously formed ink layer), by expelling ink droplets from an ink jet imaging device. After impact on the surface of said substrate, the liquid ink is radiated (e.g. with UV-radiation from a UV-lamp or UV-LED) to start a polymerization reaction of the reactive components in the ink composition to cure the ink.

In an embodiment, the digital image comprises a 2D image not containing height information for the pixels (step a), wherein the image processing step (step e) comprises appending height information to the raster of pixels located in the areas to be printed, preferably in accordance with the desired thickness of the printed image.

In an embodiment, the digital image comprises a 3D (relief) image containing height information of the pixels (step b), wherein the digital image comprises a 3D (relief) image containing height information of the pixels (step b).

According to a further embodiment the height value for a pixel in the area of the substrate intended to be finished is so large that at least the skin part and at least one layer of the white part are intended to be printed. By doing so, colors in the areas intended to be finished are less different than or even equal to the colors in the areas not intended to be finished in contrast to a situation wherein no white part layers are printed.

According to an embodiment the inking mask is adapted for smoothening an image region adjacent to the finishing lines in the inking mask, wherein the image region comprises zones adjacent to the finishing lines with a gradually increasing relative height towards the areas not intended to be finished.

The inking mask may comprise more than two (binary) inking levels, e.g. the inking mask comprises zones adjacent to the finishing lines with a gradually increasing relative height (from 0 to 1) towards the areas not intended to be finished (relative height=1). The relative height may also be termed height factor and may be multiplied with the height data of the corresponding pixels of the digital image in order to obtain the absolute height data for the printed digital image. Because the inking mask of the present embodiment does not comprise sharp transitions from finishing to non-finishing areas, the image region adjacent to the finishing lines are smoothed and the transition from finishing to non-finishing areas are hence less visible and less vulnerable.

According to an embodiment the inking mask is adapted for smoothening the printed colors near the finishing lines in the inking mask, wherein the inking mask comprises zones adjacent to the finishing lines with a gradually increasing number of layers of the white part towards the areas not intended to be finished.

According to an embodiment the method comprises the steps of reducing of the height of the relief part in the areas intended to be finished according to a height threshold per type of finishing action such that the height of the relief part in an area intended to be finished is substantially reduced to a non-zero height which is smaller than the height threshold corresponding to the type of finishing action defined for said area intended to be finished.

By doing so, the method comprises the steps of determining a threshold for a height of a pixel for cracking at a finishing line and reducing the height of the relief part to a value below the threshold. The threshold may be determined per type of finishing action. The threshold may be determined per type of substrate. The threshold may be determined per type of ink. The threshold may be predetermined by experiments with combinations of finishing actions, inks and substrates.

The invention also relates to a printing method for printing a digital image on a substantially flat substrate, the printing method comprising the steps of a) providing the digital image comprising a raster of a plurality of pixels, the digital image comprising color information for each pixel, b) providing a height channel to the digital image defining a height for each pixel, the height having a minimum value, c) discriminating in the digital image for each pixel a transparent relief part on top of a color part, the parts constituting the height of the pixel and the relief part comprising an arbitrary transparent colorant composition and the color part comprising colorants according to a color as defined by the color information for each pixel, d) providing an inking mask comprising a binary image of areas of the substrate intended to be finished after printing and areas of the substrate not intended to be finished after printing, e) image processing of the digital image by applying the inking mask to the image, wherein the height of a pixel within an area of the substrate intended to be finished after printing is reduced by substantially reducing a height of the transparent relief part of said pixel, and wherein the height of a pixel within an area of a substrate not intended to be finished after printing is left unchanged, and f) printing the processed image obtained in step e) on the substrate.

The color part may be interpreted as a 2D digital color image upon which transparent layers according to the values of the height channel for each pixel is deposited.

The invention is also related to a printed object obtained with a method according to the invention. The printed object may be a book cover, a box, a box lid, wall paper, etc.

The invention also relates to a printer comprising a controller configured for performing a method according to the invention.

According to a further embodiment the controller of the printer is configured to generate an inking mask comprising a binary image of areas to be finished and areas not to be finished. The inking mask preferably comprises areas intended to be finished with finishing lines.

In an embodiment, the controller comprises a user interface for entering input data based on which the controller generates the inking mask.

The invention also relates to a software product comprising program code on a non-transitory computer-readable medium, wherein said program code, when loaded into a computer that is connected to a printer causes the computer to perform the method according to the invention.

BRIEF DESCRIPTION OF THE DRAWINGS

The present invention will become more fully understood from the detailed description given herein below and accompanying schematic drawings which are given by way of illustration only and are not limitative of the invention, and wherein:

FIGS. 4A-4D show examples of height values after image processing the digital image with a inking mask and reducing the height values in an area to be finished according to the method of the present invention.

FIGS. 6A-6C show a method step of determining a threshold for a height of a pixel for cracking at a finishing line;

DETAILED DESCRIPTION

Figure 1:
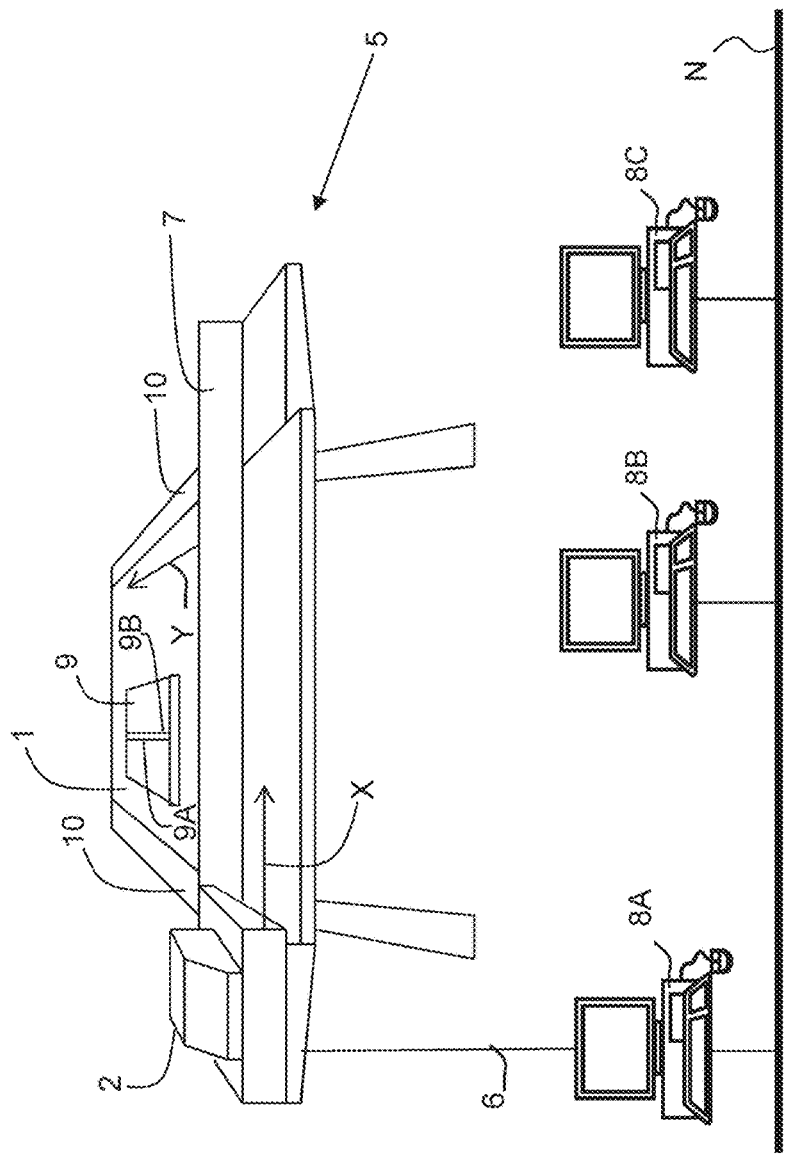
FIG. 1 shows a schematic representation of a printer according to the present invention.

FIG. 1 shows a schematic representation of a printer 5 according to the present invention. The printer 5 is configured to print a relief image on standard media or on thick media.

FIG. 1 shows a printer 5 comprising a number of workstations 8B, 8C, which may be personal computers, remote devices, mobile devices or other devices for preparing image data for prints to be printed. These workstations have access to a network N for transferring the image data to a print controller 8A that is configured to receive print jobs for prints and derive pass images for ink layers of the relief print. The print controller 8A may be part of the printer 5 that further comprises a print head 2 for applying colorants, for example cyan (C), magenta (M), yellow (Y), black (K) and white (W) colorant but other colors may be provided, or varnish, to a media object 9 placed on a flat bed surface 1 in order to obtain a printed relief image on the media object 9. The flat bed surface 1 is the surface of the flat bed which is at least partially printable by the print head 2. It is noted that the media object may be of an arbitrary shape and at an arbitrary position on the flat bed surface 1. The media object may be so small that it is completely placed on the flat bed surface 1 and has a height that is convenient for the perpendicular distance of the print head 2 to the flat bed surface 1. The media object 9, i.e. a book cover material, may be provided with any recording material or not yet. The print head 2 reciprocally scans the flat bed surface 1 in the second direction X along a gantry 7 perpendicular to a first direction Y of the gantry 7 over the flat bed surface 1 along guiding parts 10. During printing of a relief image on the media object 9 the media object 9 is not moved on the flat bed surface 1. This way of working is advantageous for rigid media objects. A material of the media object 9 may be paper, wood, glass, plexi-glass, plastic, board, textile, etc. A print head which is as wide as the flat bed surface may also be envisaged within the scope of the invention. Such a print head may be moveable in at least one direction over the flat bed surface 1. A print head which is not moveable such that the substrate is moved multiple times under the print head may also be envisioned to fall under the scope of the invention.

The printer comprises a user interface which, in this embodiment, is integrated in printer controller 8A for selecting a print job and optionally adapting a print job parameter, such as a print mode which controls the number of passes over a given swath on the media object. In another embodiment a user interface is provided as a network site that is accessible with a browser on a client computer.

The present invention consists in using an additive manufacturing printer (flat bed printer 5 or a 3D printer) for printing objects, in the present example a book cover material 9 is going to be printed upon. Basically the invention lies in the fact that in the additive manufacturing technique the image is processed such that the finishing lines 9A, 9B, defining the centers of the areas intended to be finished after printing, i.e. the height (3D) images are reduced to a non-zero height near the finishing lines 9A, 9B. In this way, during printing the image, valleys are formed in the printed matter at the positions of the finishing lines 9A, 9B. Such finishing lines 9A, 9B can serve as fold, crease, bending or cut lines along which the printed object can be easily, manually or automatically finished, i.e. folded, creased, bent or cut. The finishing after printing on the printer 5 may be executed by a finishing device (not shown) placed near the printer 5.

It is advantageous of the method according to the invention that the color information at the areas to be finished is not lost, such that a complete color image covering the whole areas to be finished is printed.

A book cover pattern can be provided as a so called 'inking mask', which basically is a binary mask indicating areas to be finished and areas not to be finished. The inking mask can be (digitally) applied to the image to be printed, to obtain a processed digital image. In case of a book cover pattern, the finishing lines are indicated as areas to be finished (black). If required the width of the finishing lines may be adapted in the inking mask depending on the kind of folding, creasing, bending or cutting action.

Therefore, in case of relief printing a book cover, a box, a box lid or wall paper, the finishing lines are not only used for defining the finishing shape of the folding, creasing, bending or cut machine, but are used to finish the printed image such that material deposition can be controlled in such a way that areas to be finished of the book cover, the box, the box lid or the wall paper are obtained automatically during printing.

Figure 2A:
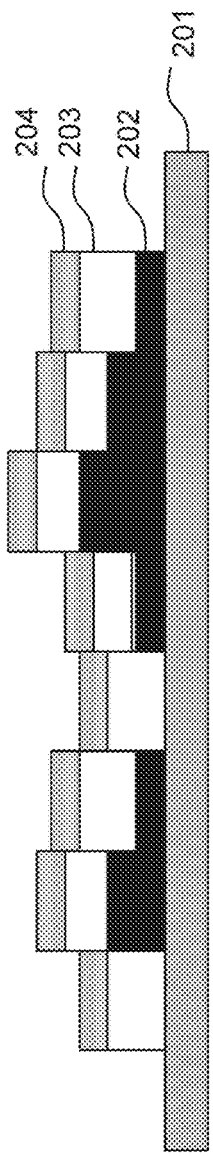
FIG. 2A shows a cross cut of a printed digital image according to the prior art.

FIG. 2A is a cross cut of a relief print according to the prior art. On a substrate 201 a number of pixels is printed comprising a relief part 202, a white part 203 and a skin part 204. The height variation of the individual pixels on the flat substrate 201 is caused by repetitive printing of colorants in the relief part 202 or by repetitive printing of substances other than colorants which substances may be cheaper. All available colorants, inks, transparent or resins without color may be used in the relief part, which provides for an optimal print speed for this part. The white part 203 is printed on top of the relief part 202 to conceal the colorants used therein and to provide a standard white background for the colorants in the skin part 204. The combination of colorants in the skin part is generated from a color management module that is calibrated for prints using the color channels of a rasterized digital image. Note that a predetermined thickness for the white part of the pixels is used, determined by the opacity of the white ink, which results in a background that is the same for all pixels.

FIGS. 2B-2G are cross cuts near a relief print area to be finished according to the method of the present invention. The number of layers in a relief part, a white part and a skin part are selected to be small for illustrating purposes and for convenience reasons. In practice a larger number of layers may be used.

Figure 2C:
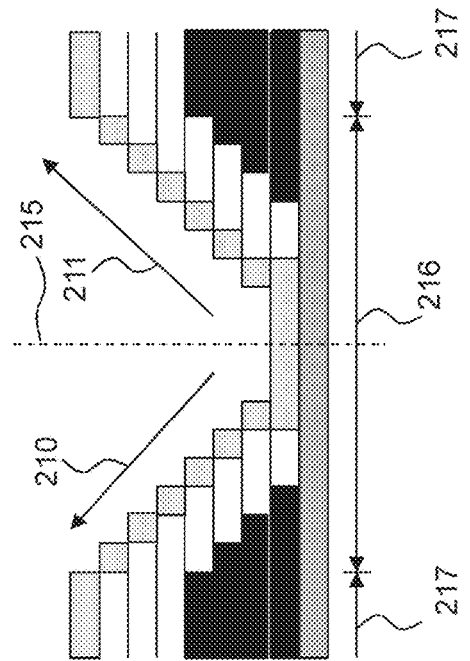
FIGS. 2B-2G schematically show cross cuts of a printed digital image near an area to be finished and printed according to the method of the present invention.
Figure 2B:
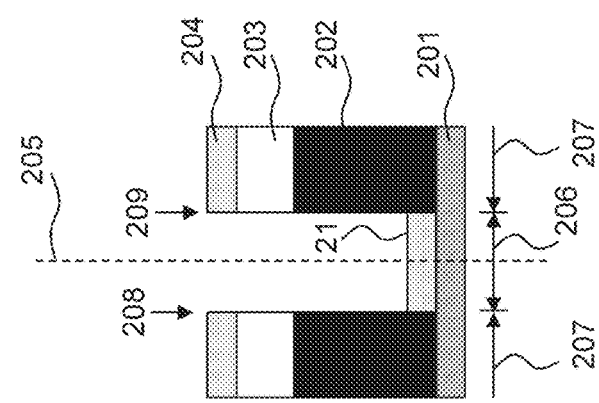

In FIG. 2B on a substrate 201 a number of pixels is printed comprising a relief part 202, a white part 203 and a skin part 204. A finishing action like a fold, crease, bending or cut is planned at a finishing line 205. It is noted that the finishing line 205 is actually extending perpendicular to the surface of the drawing. An area 206 to be finished and including and surrounding the finishing line 205 has a reduced pixel height in comparison to the pixel height in an area 207 not to be finished, but intended to be regularly printed. At the area 207 not to be finished the pixels comprise the relief part 202, the white part 203 and the skin part 204. At the area 206 to be finished the pixels do not comprise a relief part 202—or at least a relief part with a substantially reduced height (not shown)—and a white part 203, but only comprise a skin part 21 directly deposited on the substrate 201.

By doing so, the intended finishing action will not bend or cut the entire pixel column of the relief part 202, the white part 203, the skin part 204 and the substrate 201, but only the skin part 21 and the substrate 201—and in another embodiment (not shown) a relief part reduced in height—at the area 206 to be finished.

In the example in FIG. 2B a transition in pixel height between the area 206 to be finished and the area 207 not to be finished is rather abrupt leading to vertical edges 208, 209 at the boundary between the area 206 to be finished and the area 207 not to be finished.

FIG. 2C shows an example of the method wherein a transition in pixel height between an area 216 to be finished and an area 217 not to be finished is not abrupt but is smoothened. This is done by adapting the inking mask according to the method of the invention for smoothening edges near a finishing line 215 in the inking mask, wherein the inking mask comprises zones adjacent to the finishing line 215 with a gradually increasing relative height towards the areas 217 not to be finished. By doing so, the area 216 to be finished comprises the slopes 210, 211.

Figure 2D:
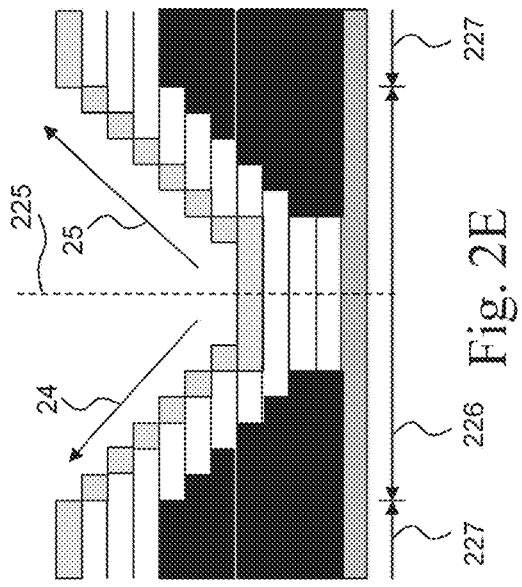

In FIG. 2D on a substrate 221 a number of pixels is printed comprising a relief part 222, a white part 223 and a skin part 224. A finishing action like a fold, crease, bending or cut is planned at the finishing line 225. An area 226 to be finished and including and surrounding the finishing line 225 has a reduced pixel height in comparison to the pixel height in an area 227 not to be finished, but intended to be regularly printed. At the area 227 not to be finished the pixels comprise the relief part 222, the white part 223 and the skin part 224. At the area 226 to be finished the pixels do not comprise a relief part 222 or comprises at least a relief part of a substantially reduced height, but do comprise a skin part 22 upon a white part 23 which is directly deposited on the substrate 221. By doing so, unwanted color differences between the area 226 and the area 227 are reduced or eliminated.

Figure 2E:
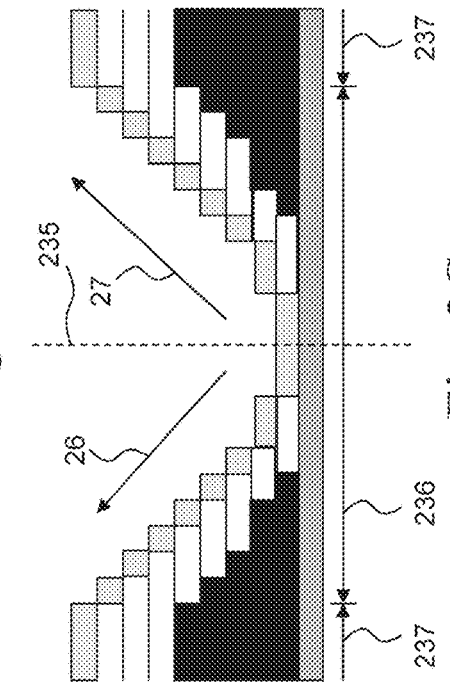

To avoid the steep edges between the area 226 and the area 227, in FIG. 2E a transition in pixel height between the area 226 to be finished and the area 227 not to be finished is not abrupt but is smoothened. This is done by adapting the inking mask according to the method of the invention for smoothening edges near a finishing line 225 in the inking mask, wherein the inking mask comprises zones adjacent to the finishing line 225 with a gradually increasing relative height towards the areas 227 not to be finished. By doing so, the area 226 to be finished comprises the slopes 24, 25.

Figure 2F:
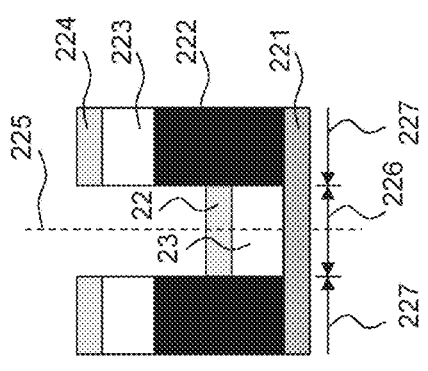

In FIG. 2F the inking mask is adapted for smoothening the printed colors near the finishing line 225 in the inking mask, wherein the inking mask comprises zones B, A adjacent to the finishing line 225 with a gradually increasing number of layers of the white part towards the areas 227 not to be finished.

Figure 2G:
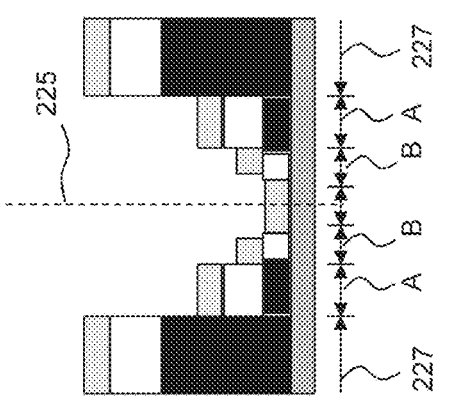

In FIG. 2G a transition in pixel height between an area 236 to be finished and areas 237 not to be finished is not abrupt but is smoothened. This is done by adapting the inking mask according to the method of the invention for smoothening edges near a finishing line 235 in the inking mask, wherein the inking mask comprises zones adjacent to the finishing line 235 with a gradually increasing relative height towards the areas 237 not to be finished. By doing so, the area 236 to be finished comprises slopes 26, 27.

In FIG. 2G the inking mask is also adapted for smoothening the printed colors near the finishing line 235 in the inking mask, wherein the inking mask comprises zones adjacent to the finishing line 235 with a gradually increasing number of layers of the white part from 1 white layer via 2 white layers in the area 236 to be finished towards 3 white layers in the areas 237 not to be finished.

Figure 3:
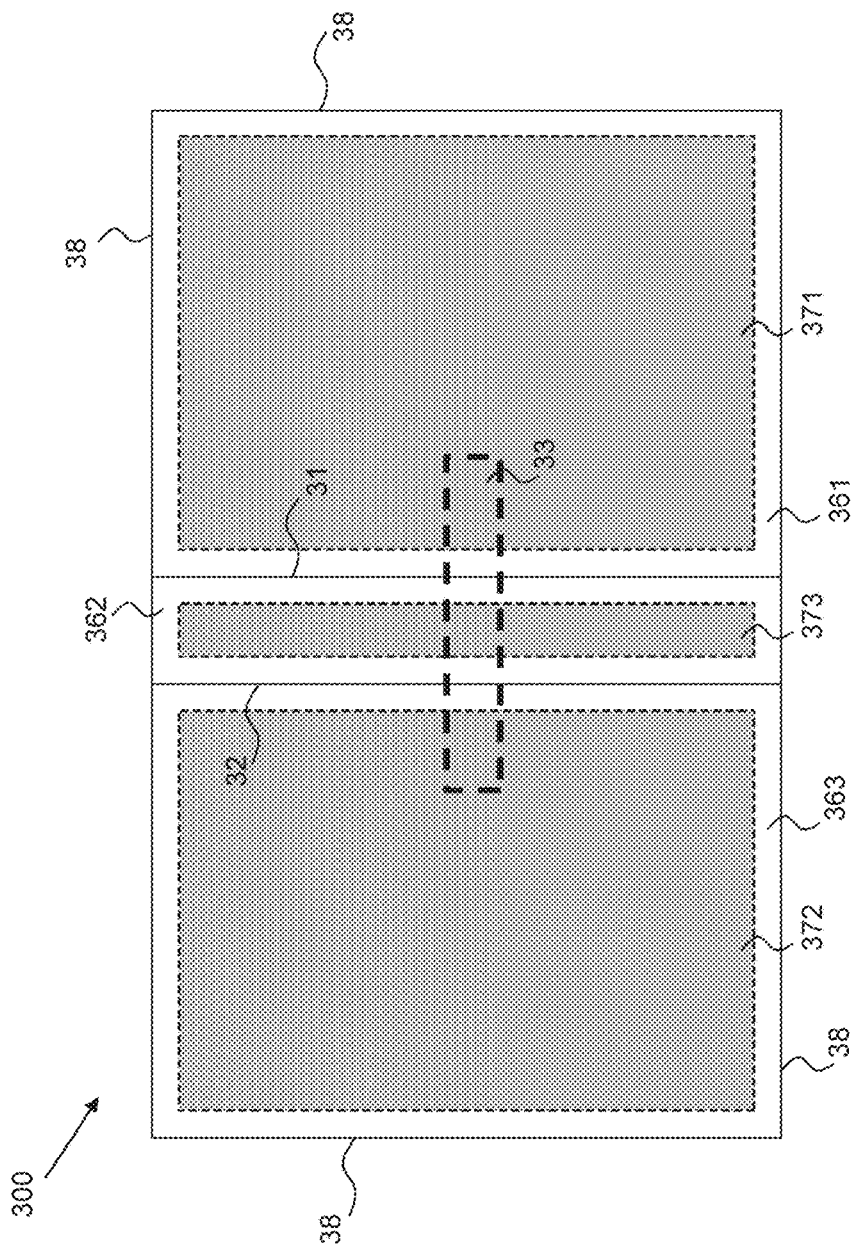
FIG. 3 schematically shows an example of an inking mask used in image processing for a book cover according to the present invention.

FIG. 3 shows an inking mask 300 for a book cover having four edges 38. The book cover is intended to be folded along to fold lines 31,32.

Areas not to be finished are referenced to by reference numbers 371, 372, 373 and are grey colored. Each pixel in the areas not to be finished 371, 372, 373 has a binary value 1 in the inking mask.

Areas to be finished are referenced to by reference numbers 361, 362, 363 and are white colored. The areas 361, 362, 363 to be finished comprise zones near the folding lines 31, 32. The areas 361, 362, 363 to be finished optionally comprise zones along the edges 38 of the inking mask. Each pixel in the areas 361, 362, 363 to be finished has a binary value 0 in the inking mask in the example corresponding to FIG. 2B.

According to another embodiment the inking mask comprises more than two (binary) inking levels, e.g. the inking mask comprises zones adjacent to the finishing lines with a gradually increasing relative height (from 0 to 1) towards the areas not to be finished (relative height=1). The relative height may also be termed height factor and may be multiplied with the height data of the corresponding pixels of the digital image in order to obtain the absolute height data for the printed digital image. Because the inking mask of this embodiment does not comprise sharp transitions from finishing to non-finishing areas, the edges of the finishing areas are smoothed and hence less visible and less vulnerable.

An area 33 will be zoomed in at in FIG. 4 in order to explain height values of the inking mask in the area 33.

FIGS. 4A-4D show height values in the area 33 shown in FIG. 3. The height values are per part, i.e. the skin part, the white part and the relief part of the pixels from a left side of the area 33 to a right side of the area 33. For convenience reasons, a height value of the skin part is considered to be 1 layer. Other non-zero height values for the skin part may be envisioned. For convenience reasons, a regular height value for the white part in pixels in areas 371, 372, 373 not to be finished in FIG. 3 is considered to be 3 layers. Other non-zero height values for the white part of pixels in the areas 371, 372, 373 not to be finished may be envisioned. The height value of the relief part in the areas 361, 362, 363 to be finished in FIG. 3 is zero according to an embodiment of the method of the present invention. According to another embodiment of the method of the invention the height value of the relief part in the areas 361, 362, 363 to be finished is substantially reduced (not shown). The reduction of the height of the relief part in the areas 361, 362, 363 may be predetermined by a crack threshold when cracking of the substrate does not occur. In the latter case the height of the relief part is then substantially reduced to a non-zero height which is smaller than the originally planned height of the relief part.

Figures 4A, 4B, 4C, 4D:
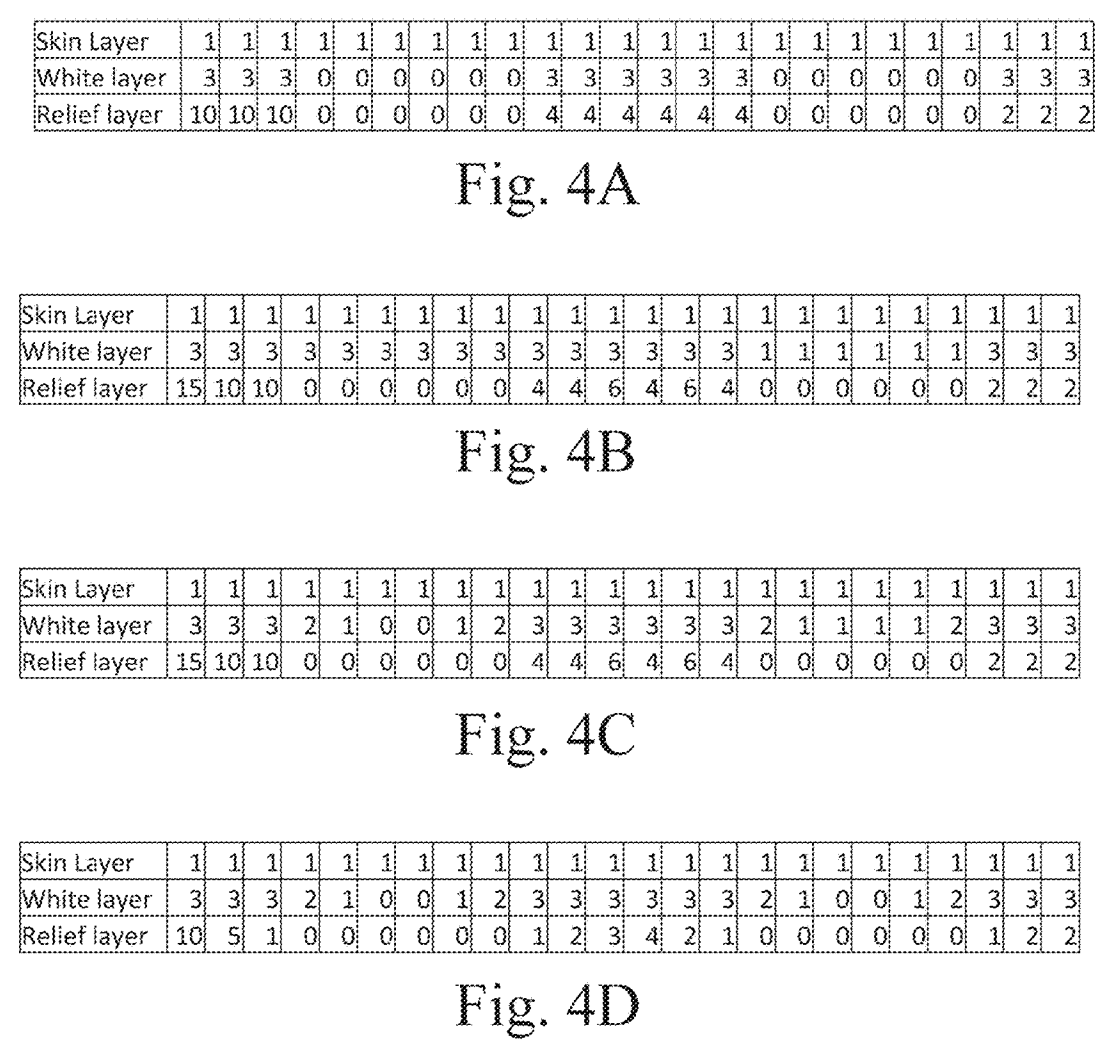

FIG. 4A corresponds to the method according to the invention as applied in FIG. 2B with steep edges between the areas 361, 362, 363 to be finished and the areas 371, 372, 373 not to be finished.

FIG. 4B corresponds to the method according to the invention as applied in FIG. 2D with steep edges between the areas 361, 362, 363 to be finished and the areas 371, 372, 373 not to be finished but with color preservation in the areas 361, 362, 363 to be finished due to the deposited white layer part in the areas 361, 362, 363 to be finished.

FIG. 4C corresponds to the method according to the invention as applied in FIG. 2F with a smoothing of the colors in the areas 361, 362, 363 to be finished due to a gradually decrease of the numbers of white layers in the areas 361, 362, 363 to be finished.

FIG. 4D corresponds to the method according to the invention as applied in FIG. 2G, wherein besides the smoothening of the white part in the areas 361, 362, 363 to be finished also the relief part is smoothened, for example from 10 layers on the left side of the area 33 in FIG. 3 via 5 layers to 1 layer of relief towards the first finishing line 32 in FIG. 3.

Figure 5A:
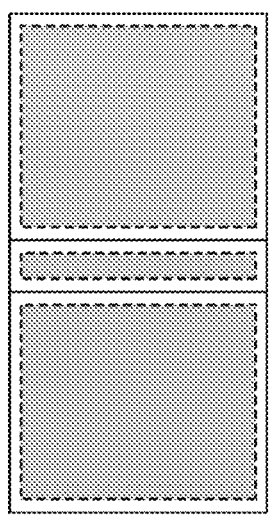
FIGS. 5A-5B show examples of inking masks for a book cover and for a box lid respectively.

FIG. 5A shows an example of an inking mask for a book cover. The inking mask takes two fold lines and the edges of the book cover into account.

Figure 5B:
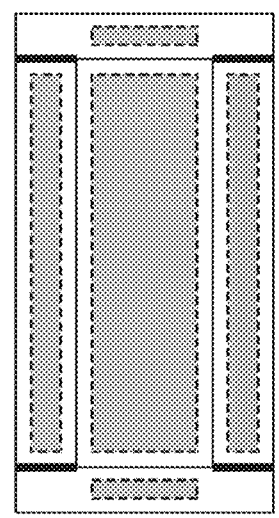

FIG. 5B shows an example of an inking mask for a lid of a box. The inking mask takes fold lines (shown as ordinary lines), cut lines (shown as bold lines) as well as edges into account.

In FIGS. 5A-5B the areas to be finished are white colored and the areas not to be finished are grey colored.

FIGS. 6A-6C show a method step of determining a threshold for a height of a pixel for cracking at a finishing line and reducing the height of the relief part to a value below the threshold. Thresholds may be determined per type of finishing action, per ink type and/or per type of substrate. Thresholds may be predetermined by experiments with finishing actions, inks and substrates.

A test set up may be folding a stroke of 2.5 cm of substrate 601 over an 180 degree's angle as shown in FIG. 6A. FIG. 6A(1) shows a flat substrate 601 with applied ink layers 602. FIG. 6A(2) shows the folded substrate with no cracking of the ink layers. FIG. 6A(3) shows the folded substrate with a cracking of the ink layers. The substrate 601 may be for example Océ Outdoor Paper 212 g/m$^2$ with a thickness of 230 µm but other substrates may be envisioned.

FIG. 6B shows on the left side a book cover printed with an ink type a with a thickness of the ink layers of 20 µm without any crack. FIG. 6B shows in the middle a book cover printed with an ink type a with a thickness of the ink layers of 75 µm resulting in a crack of the ink layers such that a part of the substrate becomes visible. FIG. 6C shows on the right side a book cover printed with an ink type b with a thickness of the ink layers of 75 µm resulting in no crack of the ink layers.

FIG. 6C show results of a small experiment for the ink type a and the ink type b. The threshold for ink type a may be determined to be equal to 30 µm. The threshold for ink type b may be determined to be larger than 75 µm. Ink type a and b may be for example Océ UV-Curable ink types but other ink types may be envisioned. Other kind of ink types, like more flexible inks may be envisioned.

Figure 7:
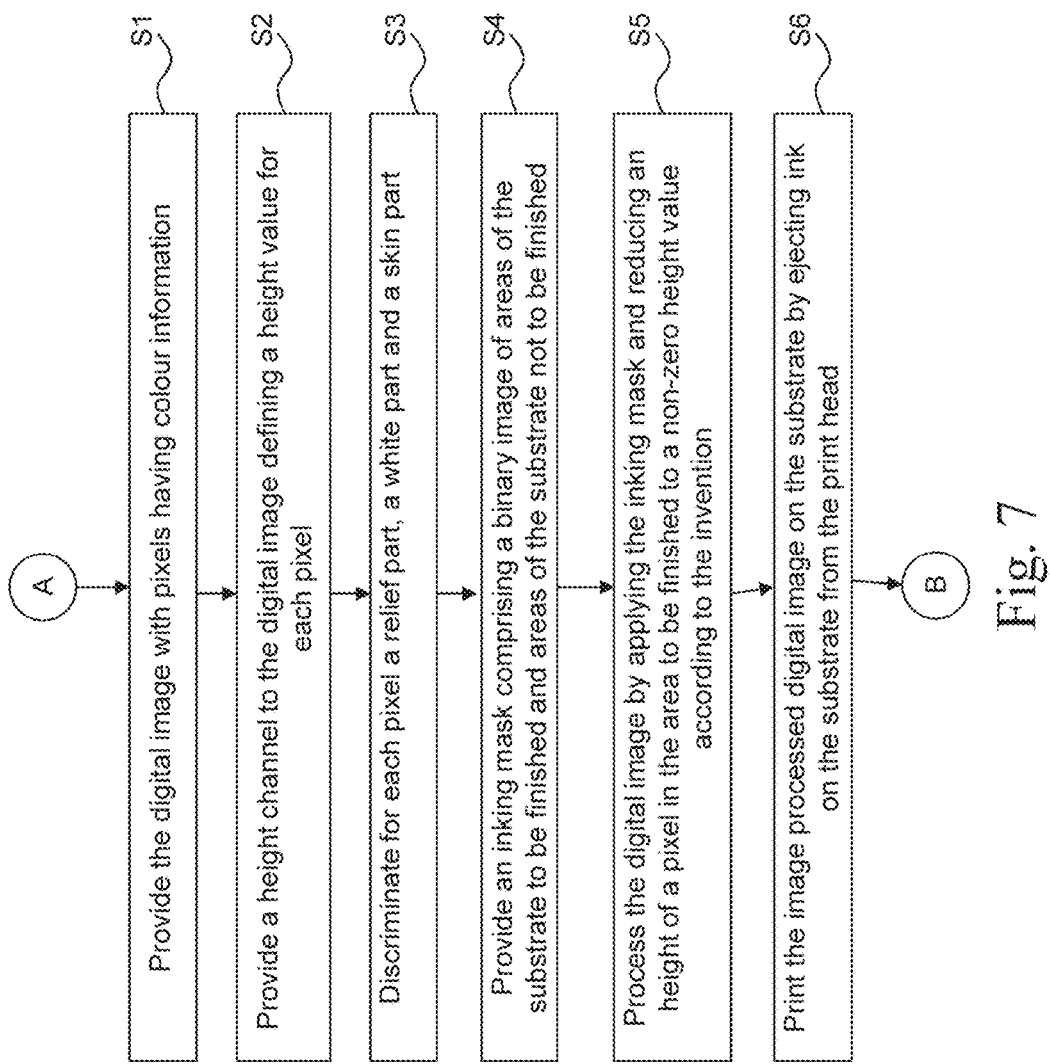
FIG. 7 is a flow diagram of the method according to the present invention.

FIG. 7 is a flow diagram of the method according to the invention.

The method starts in a starting point A which leads to a first step S1.

In the first step S1 the digital image is provided comprising a raster of a plurality of pixels. The digital image comprises color information for each pixel.

In a second step S2 a height channel is provided to the digital image defining a height for each pixel. The height has a minimum non-zero value.

The first step S1 may be combined with the second step S2 when a digital image is received which besides color information per pixel also comprises height values for the pixels.

In a third step S3 for each pixel in the digital image a relief part, a white part and a skin part is discriminated. The parts constitute the height of the pixel. The relief part comprises an arbitrary colorant composition. The white part comprises a number of colorants including a white colorant. The skin part comprises colorants according to a color as defined by the color information for each pixel.

In a fourth step S4 an inking mask is provided which comprises a binary image of areas of the substrate to be finished and areas of the substrate not to be finished.

In a fifth step S5 the digital image is image processed by applying the inking mask to the image, wherein the height of a pixel within an area of the substrate to be finished is reduced to a non-zero height value and wherein the height of a pixel within an area of a substrate not to be finished is left unchanged. The non-zero height value is so small that no relief part or an in height reduced relief part is intended to be printed for the pixels in an area of the substrate to be finished and so large that at least the skin part is intended to be printed for the pixels in an area of the substrate to be finished. Examples of applicable non-zero height values in the areas to be finished are described here-above and shown in FIGS. 4A-4D.

In a sixth step S6 the image processed image obtained in the fifth step S5 is printed on the substrate. The method ends in an end point B.

FIG. 8 is an alternative embodiment of the method according to the invention.

According to this alternative embodiment the method comprises the steps of a) providing the digital image comprising a raster of a plurality of pixels, the digital image comprising color information for each pixel, b) providing a height channel to the digital image defining a height for each pixel, the height having a minimum value, c) discriminating in the digital image for each pixel a transparent relief part on top of a color part, the parts constituting the height of the pixel and the relief part comprising an arbitrary transparent colorant composition and the color part comprising colorants according to a color as defined by the color information for each pixel, d) providing an inking mask comprising a binary image of areas of the substrate to be finished and areas of the substrate not to be finished, e) image processing of the digital image by applying the inking mask to the image, wherein the height of a pixel within an area of the substrate to be finished is reduced by substantially reducing a height of the transparent relief part of said pixel, and wherein the height of a pixel within an area of a substrate not to be finished is left unchanged, and f) printing the processed image obtained in step e) on the substrate.

The color part may be interpreted as a 2D digital color image upon which transparent layers according to the values of the height channel for each pixel is deposited.

Figure 8A:
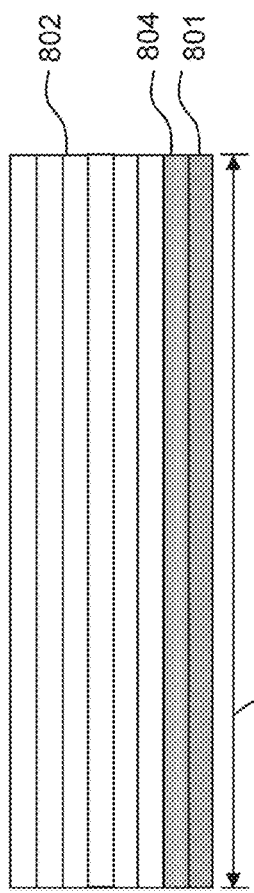
FIGS. 8A-8B is an alternative embodiment of the method according to the invention.
Figure 8B:
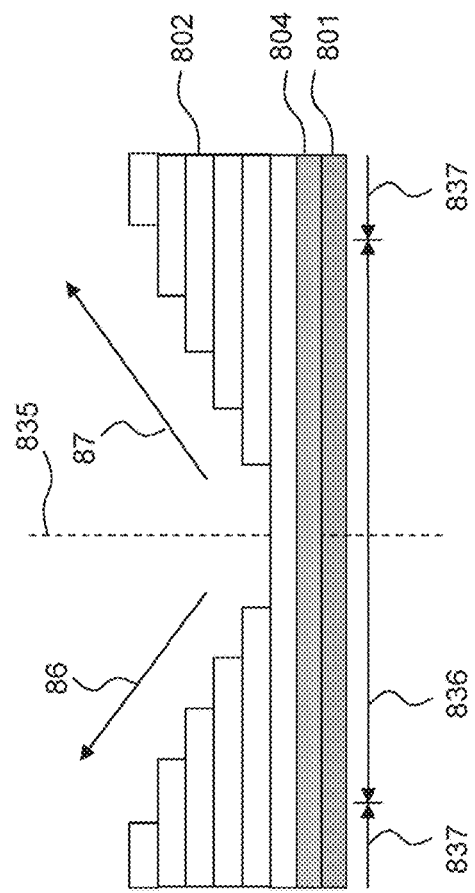

This embodiment is illustrated by cross cuts of the printed layers in FIGS. 8A-8B. A color part 804 is directly deposited on a substrate 801. Upon the color part 804 a transparent relief part 802 of multiple layers is deposited. The transparent relief part 802 may consist of a transparent ink, a varnish, or any other transparent printable material. FIG. 8A shows an area 837 not to be finished wherein the height of the pixels is constant. FIG. 8B shows an area 837 not to be finished and an area 836 to be finished and surrounding a finishing line 835. The height of the pixels in the area 836 to be finished is substantially reduced in order to prevent cracking of the layers deposited on the substrate 801. The height of the pixels in the area 836 to be finished are stepwise decreased towards the finishing line 835. A transition in pixel height between an area 836 to be finished and areas 837 not to be finished is not abrupt but is smoothened. This is done by adapting the inking mask according to the method of the invention for smoothening edges near the finishing line 835 in the inking mask, wherein the inking mask comprises zones adjacent to the finishing line 835 with a gradually increasing relative height towards the areas 837 not to be finished. By doing so, the area 836 to be finished comprises slopes 86, 87.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims is herewith disclosed.

Further, the terms and phrases used herein are not intended to be limiting; but rather, to provide an understandable description of the invention. The terms "a" or "an", as used herein, are defined as one or more than one.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A printing method for printing a digital image on a substantially flat substrate, the printing method comprising the steps of:
    providing the digital image comprising a raster of a plurality of pixels, the digital image comprising color information for each pixel;
    providing a height channel to the digital image defining a height for each pixel, the height having a minimum value;
    discriminating in the digital image for each pixel a relief part, a white part and a skin part, the parts constituting the height of the pixel and the relief part comprising an arbitrary colorant composition, the white part comprising a number of colorants including a white colorant and the skin part comprising colorants according to a color as defined by the color information for each pixel;
    providing an inking mask comprising a binary image of areas of the substrate intended to be finished after printing and areas of the substrate not intended to be finished after printing;
    image processing of the digital image by applying the inking mask to the image, wherein the height of a pixel within an area of the substrate intended to be finished after printing is reduced by substantially reducing a height of the relief part of said pixel, and wherein the height of a pixel within an area of a substrate not intended to be finished after printing is left unchanged; and
    printing the processed image obtained in the step of image processing on the substrate,
    wherein a finishing action in the area intended to be finished after printing is at least one out of a fold, a crease, a bending and a cut of the substrate.

2. The printing method according to claim 1, wherein the height value of each pixel in the area of the substrate intended to be finished after printing is so large that at least the skin part is intended to be printed.

3. The printing method according to claim 2, wherein the height value of each pixel in the area of the substrate intended to be finished after printing is so small that no relief part is intended to be printed.

4. The printing method according to claim 1, wherein the area intended to be finished after printing comprises an edge of the substrate.

5. The printing method according to claim 1, wherein the areas of the substrate intended to be finished after printing are including and surrounding finishing lines.

6. The printing method according to claim 2, wherein the height value for a pixel in the area of the substrate intended to be finished after printing is so large that at least the skin part and at least one layer of the white part are intended to be printed.

7. The printing method according to claim 1, wherein the inking mask is adapted for smoothening an image region adjacent to the finishing lines in the inking mask, wherein the image region comprises zones adjacent to the finishing lines with a gradually increasing relative height towards the areas not intended to be finished after printing.

8. The printing method according to claim 1, wherein the inking mask is adapted for smoothening the printed colors near the finishing lines in the inking mask, wherein the inking mask comprises zones adjacent to the finishing lines with a gradually increasing number of layers of the white part towards the areas not intended to be finished after printing.

9. The printing method according to claim 1, further comprising the steps of reducing of the height of the relief part in the areas intended to be finished after printing according to a height threshold per type of finishing action such that the height of the relief part in an area intended to be finished after printing is substantially reduced to a non-zero height which is smaller than the height threshold corresponding to the type of finishing action defined for said area intended to be finished after printing.

10. The printing method according to claim 1, wherein the processed image printed in the step of printing is a book cover, a box, a box lid or wall paper.

11. A printer comprising a controller configured for performing the method according to claim 1.

12. The printer according to claim 11, wherein the controller is configured to generate an inking mask comprising a binary image of areas intended to be finished and areas not intended to be finished.

13. A software product comprising program code on a non-transitory computer-readable medium, wherein said program code, when loaded into a computer that is connected to a printer causes the computer to perform the method according to claim 1.

14. The printing method according to claim 5, wherein the finishing lines are fold lines, crease lines, bending lines and/or cut lines.

\* \* \* \* \*